United States Patent [19]

Ishikawa

[11] Patent Number: 4,916,741
[45] Date of Patent: Apr. 10, 1990

[54] FM/FMX STEREOPHONIC RECEIVER

[75] Inventor: Tsutomu Ishikawa, Oota, Japan

[73] Assignee: Sanyo Electric Co., Ltd., Osaka, Japan

[21] Appl. No.: 170,908

[22] Filed: Mar. 21, 1988

[30] Foreign Application Priority Data

Mar. 27, 1987 [JP] Japan .................................. 62-75370
May 18, 1987 [JP] Japan ................................ 62-120814

[51] Int. Cl.⁴ .............................................. H04H 5/00
[52] U.S. Cl. ..................................... 381/13; 381/106
[58] Field of Search ..................... 381/2, 3, 4, 13, 106; 333/14

[56] References Cited

U.S. PATENT DOCUMENTS

| | | |
|---|---|---|
| 4,195,203 | 3/1980 | Sakai et al. |
| 4,485,483 | 11/1984 | Torick et al. ......................... 381/14 |
| 4,602,380 | 7/1986 | Stebbings ............................. 381/13 |
| 4,602,381 | 7/1986 | Cugnini et al. ...................... 381/13 |
| 4,674,122 | 6/1987 | Orban ................................... 381/13 |
| 4,704,727 | 11/1987 | Beard ................................... 381/13 |
| 4,742,570 | 5/1988 | Ichikawa ............................. 381/94 |
| 4,751,734 | 6/1988 | Ructenwald ........................ 381/13 |
| 4,752,955 | 6/1988 | Torick ................................. 381/13 |

OTHER PUBLICATIONS

"Improving The Signal-To-Noise Ratio And Coverage of FM Stereophonic Broadcasts", E. L. Torick and T. B. Keller, Journal of the Audio Engineering Society vol. 33, No. 12, Dec., 1985.

Primary Examiner—Forester W. Isen
Attorney, Agent, or Firm—Darby & Darby

[57] ABSTRACT

An FMX stereophonic receiver for receiving an FMX stereophonic broadcast signal, which includes a stereo sum signal, a stereo difference signal and a compressed stereo difference signal, is disclosed. When multipath interference takes place, noise signal will be produced, which adversely affects on a level control of an added signal of the stereo difference signal and the compressed stereo difference signal. The disclosed receiver includes a detector for detecting the multipath noise signal contained in the FMX stereophonic broadcast signal. When the multipath noise signal is detected, FMX receiving mode is automatically changed to FM receiving mode by a selecting means, so as to reduce the affect of the noise signal.

5 Claims, 3 Drawing Sheets

Fig. 1
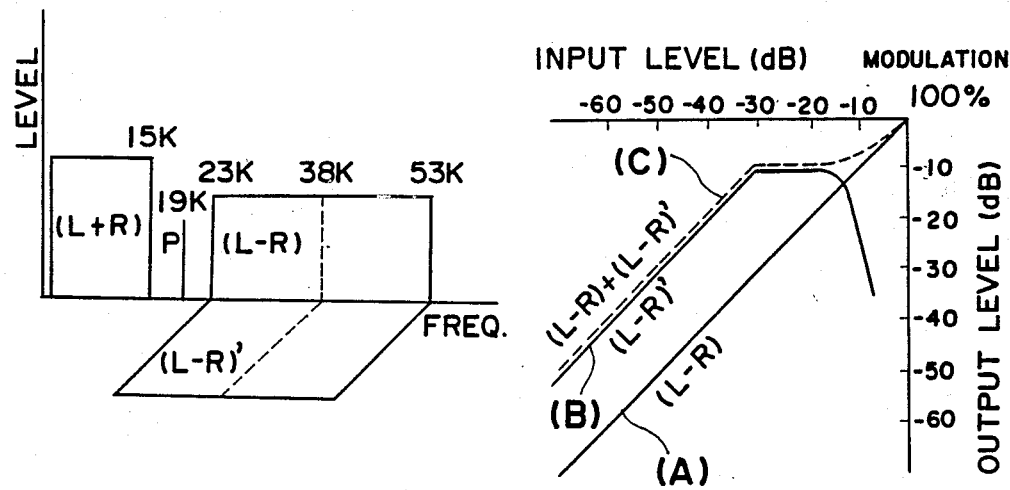
Fig. 2
Fig. 3 PRIOR ART
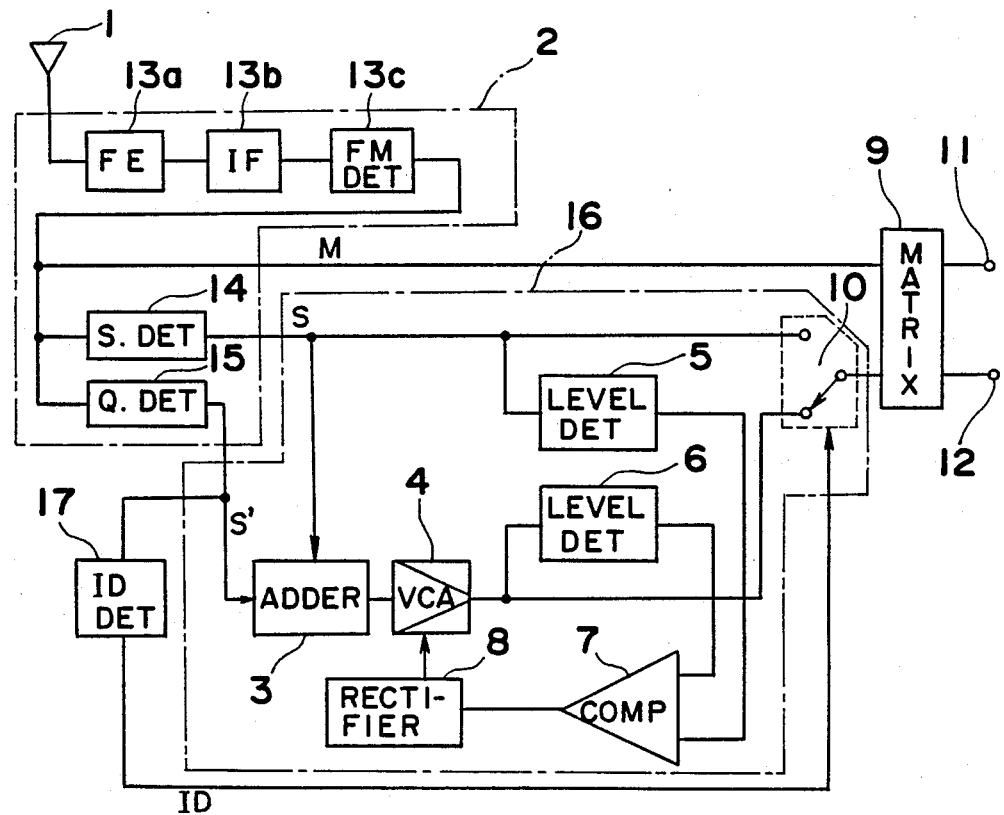

FM/FMX STEREOPHONIC RECEIVER

BACKGROUND OF THE INVENTION

1. Field of the Invention

The present invention relates to an FMX stereophonic receiver and, more particularly, to an FMX stereophonic receiver able to prevent deterioration of stereophonic channel separation caused by field strength variation.

2. Description of the Prior Art

FMX stereophonic broadcasting has been proposed as one means of enlarging the service area and improving the signal-to-noise ratio characteristics of FM stereo broadcasts. The transmission signal of the aforementioned FMX stereo broadcast includes a compressed stereo difference signal $(L-R)'$ broadcast simultaneously with the transmission signal of conventional FM stereo broadcasting, for example, a stereo sum signal $(L+R)$ and stereo difference signal $(L-R)$. The transmission signal can be expressed as:

$$f(t) = (L+R) + P\sin(w/2)t + (L-R)\sin wt + (L-R)'\cos wt \quad (1)$$

where $L+R$ is a stereo sum signal, $L-R$ is a stereo difference signal, P is a stereo pilot signal, and w is the subcarrier angular frequency. As shown by aforementioned Equation (1), compressed stereo difference signal $(L-R)'$ is quadrature modulated from uncompressed stereo difference signal $(L-R)$, resulting in an FMX stereo broadcast transmission signal spectrum shown in FIG. 1.

Furthermore, the relationship between the uncompressed stereo difference signal $(L-R)$ and the compressed stereo difference signal $(L-R)'$ is as shown in FIG. 2 which expresses the compression characteristics. In FIG. 2, when the input signal level is low, the aforementioned signal $(L-R)'$ is 20 dB greater than the uncompressed stereo difference signal $(L-R)$ and, at the same time, input/output characteristics become linear, and also the compression ratio becomes 1:1. When the level of the input signal is medium (approximately $-30$ dB), the compression ratio becomes $\infty:1$, and input/output characteristics are flat over a range of approximately 10 dB. When the input signal level becomes high, the aforementioned signal $(L-R)'$ rapidly attenuates. Therefore, compressed stereo difference signal $(L-R)'$ is as shown by solid line B in FIG. 2 with respect to stereo difference signal $(L-R)$ (solid line A), and the sum signal of the aforementioned signal $(L-R)$ and the aforementioned signal $(L-R)'$ is as shown by dotted line C in FIG. 2.

As discussed above, the transmission signal for FMX stereophonic broadcasting is received by a receiver as shown in FIG. 3. In FIG. 3, the FMX stereophonic broadcast transmission signal received by antenna 1 is received by a receiving circuit 2 of the same construction as a conventional FM stereophonic receiver in which stereo sum signal $(L+R)$ (hereafter referred to as M), stereo difference signal $(L-R)$ (hereafter referred to as S), and compressed stereo difference signal $(L-R)'$ (hereafter referred to as S') are each demodulated. When the received signal is detected by the FM detection circuit 13c included in the receiving circuit, stereo sum signal M is demodulated. When the stereo composite signal is detected by the synchronous detection circuit 14 using the 38-kHz subcarrier signal obtained from the PLL in the receiving circuit, uncompressed stereo difference signal S is demodulated. And when the stereo composite signal is detected by the quadrature detection circuit 15, compressed stereo difference signal S' is demodulated.

Uncompressed and compressed stereo difference signals S and S' obtained from receiving circuit 2 are added by adder 3, and the result is applied to VCA (voltage control amplifier) 4 operating as an attenuator. When stereo difference signal S and output signal $(S+S')$ of VCA 4 are greater than a specified level (a knee-point level), first and second level detection circuits 5 and 6, each having a threshold level, operate in such a manner that the level of stereo difference signal S and the level of aforementioned output signal $(S+S')$ of VCA 4 are respectively detected by first and second level detection circuits 5 and 6, and are compared by comparator circuit 7. Next, a signal according to the level difference obtained from aforementioned comparator circuit 7 is rectified and smoothed by rectifying circuit 8, and the rectified signal is applied to VCA 4 as a control signal. The output signal $(S+S')$ of aforementioned VCA 4 is controlled by this control signal to be equal to the level of stereo difference signal S. However, when aforementioned stereo difference signal S and output signal $(S+S')$ of VCA 4 are below the knee-point level, first and second level detection circuits 5 and 6 do not operate, and attenuation at VCA 4 is fixed at approximately 20 dB.

Although stereo sum signal M obtained from receiving circuit 2 is applied directly to matrix circuit 9, stereo difference signal S or output signal $(S+S')$ of VCA 4 are selected by switch 10, and applied to matrix circuit 9. A 10-Hz ID signal is included in the FMX stereophonic broadcast transmission signal, and FMX stereophonic broadcasts are differentiated from conventional FM stereophonic broadcasts by the aforementioned ID signal. In addition, because an ID detection circuit 17 which detects the aforementioned ID signal is provided, whether the broadcast is FMX stereo or not can be determined with the output signal of ID detection circuit 17. Switch 10 is controlled by the aforementioned ID signal. When the ID signal (such as a HIGH level signal) is present, switch 10 is switched to a position as shown in FIG. 3. Accordingly, stereo sum signal M and output signal $(S+S')$ from level controlled VCA 4 are matrixed, and left and right stereo signals L and R are generated at left and right output terminals 11 and 12. Furthermore, when the ID signal is not present, switch 10 is switched to a position opposite to that shown in FIG. 3, and stereo sum signal M and stereo difference signal S are matrixed in matrix circuit 9.

As described above, because FMX stereophonic broadcast system uses compressed and expanded stereo difference signal S, it is possible to achieve significant improvements in the S/N ratio, and the service area can be enlarged comparably equal to that of the conventional monaural FM broadcast system.

It is to be noted that the FMX stereophonic broadcast transmission signal can be accurately received by a conventional FM stereophonic receiver. In this case, compressed stereo difference signal S' is quadrature modulated with respect to stereo difference signal S, and reception is not adversely affected.

Details concerning FMX stereophonic broadcasting are disclosed, for example, in an article "Improving the Signal-to-Noise Ratio and Coverage of FM Stereophonic Broadcasts" by Emil L. Torick and Thomas B.

Keller in "JOURNAL OF THE RADIO ENGINEERING SOCIETY", volume 33, number 12, issued Dec. 1985.

However, there is such a problem in the prior art FMX stereophonic receiver that during the receiving of the FMX stereophonic broadcast signal, multipath interference may occur to produce unwanted noise signals (hereinafter referred to as multipath noise signals), resulting in poor receiving condition. Although such multipath interference may cause some deterioration in the FM stereophonic receiver, the affect by the multipath interference is more serious in the case of FMX stereophonic receiver. More specifically, in the case of FMX stereophonic receiver, since it is necessary to expand the signal (S+S'), which is the sum of compressed stereo difference signal S' and the stereo difference signal S, the affect of the multipath noise signals with respect to the sum signal (S+S') will be enhanced to deteriorate the receiving condition, as explained below.

When the multipath interference occurs, the levels of compressed stereo difference signal S' and the stereo difference signal S vary. When the amount of variation caused by the multipath interference differs between the signals S and S', comparator 7 produces abnormal control signal to cause VCA 4 to attenuate the signal improperly. Therefore, the amount of compression effected in the broadcasting station and the amount of expansion effected in the receiver will not be the same, resulting in undesired output level of the signal produced from VCA 4.

SUMMARY OF THE INVENTION

The present invention has been developed with a view to substantially solving the above described problems and has for its essential object to provide an FM/FMX stereophonic receiver which can reduce the affect of the noise signal caused by the multipath interference.

In accomplishing these and other objects, an FM/FMX stereophonic receiver according to the present invention comprises noise detector for detecting the multipath noise signal contained in the FMX stereophonic broadcast signal and for producing a detection signal when the multipath noise signal is detected, and selector for selecting either one of FM receiving mode or FMX receiving mode. The selector automatically selects the FM receiving mode when the multipath noise signal detector produces the detection signal.

According to a preferred embodiment of the present invention the FM/FMX stereophonic receiver comprises a first detector for detecting and producing the stereo difference signal, a second detector for detecting and producing the compressed stereo difference signal, a decoder for decoding and producing a sum of the stereo difference signal and the compressed stereo difference signal, a third detector for detecting and producing the ID signal, fourth detector for detecting multipath noise signal contained in the FMX stereophonic broadcast signal and for producing a detection signal when the multipath noise signal is detected, and selector, responsive to the detection of the ID signal by the third detector, for selecting the signal from the first detector when the fourth detector produces the detection signal, and for selecting the signal from the second detector when the fourth detector produces no detection signal.

Also, according to the present invention, an FMX stereophonic receiver comprises first detector for detecting and producing the stereo difference signal, a second detector for detecting and producing the compressed stereo difference signal, a decoder for decoding and producing a sum of the stereo difference signal and the compressed stereo difference signal, a level controller for controlling a level of the signal produced from the second detector, a comparator for comparing levels of the signals produced from the first detector and the level controller and for producing a compare result signal, a transmitting means for transmitting the compare result signal to the level controller, a third detector for detecting multipath noise signal contained in the FMX stereophonic broadcast signal and for producing a detection signal when the multipath noise signal is detected, and cutting means inserted in the transmitting means for cutting the transmission of the compare result signal from the comparator to the level controller when the third detector produces the detection signal, and for establishing the transmission of the compare result signal from the comparator to the level controller when the third detector produces no detection signal.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 1 is a graph showing an FMX stereo broadcast transmission signal spectrum;

FIG. 2 is a graph showing input/output characteristics of stereo difference signals;

FIG. 3 is a circuit diagram of an FMX stereophonic receiver according to prior art;

DETAILED DESCRIPTION OF THE INVENTION

Figure 4:
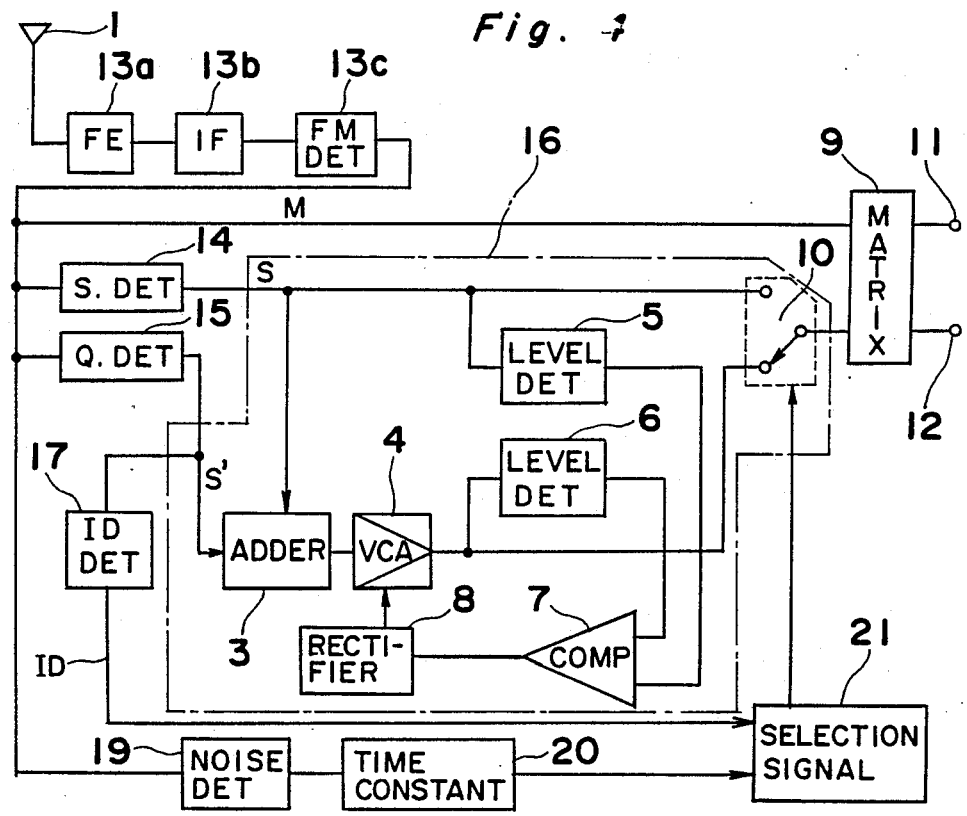
FIG. 4 is a circuit diagram of an FM/FMX stereophonic receiver according to a first embodiment of the present invention.

Referring to FIG. 4, an FM/FMX stereophonic receiver according to a first embodiment of the present invention is shown. In FIG. 4, reference number 13a indicates a front end in which a signal received by antenna 1 is converted to an IF signal. Reference number 13b is an IF amplifier which amplifies an IF signal. Reference number 13c is an FM detector, and reference number 14 is a synchronous detector which synchronously detects an uncompressed stereophonic difference signal S, which is included in the output signal (a composite signal) of the FM detector 13c. Reference number 15 is a quadrature detector which synchronously detects compressed stereophonic difference signal S' included in the aforementioned composite signal.

Reference number 16 is a selector and expander which generates a level controlled signal (S+S') using uncompressed stereophonic difference signal S and compressed stereophonic difference signal S', and which selects uncompressed stereophonic difference signal S or the aforementioned signal (S+S') by a switch 10. Reference number 9 is a matrix circuit which matrixes stereophonic sum signal M obtained from FM detector 13c with the output signal of selector 16 for producing the stereo left and right signals from output terminals 11 and 12, respectively. Reference number 17 is an ID detector defined by a low pass filter which detects a 10-Hz ID signal included in the composite signal.

Reference number 19 is a noise detector for detecting the multipath noise signal contained in the composite signal, reference number 20 is a time constant circuit for producing a LOW or HIGH level signal in response to the detection or non-detection of the multipath noise signal, respectively, by noise detector 19, and reference number 21 is a selection signal producer for producing a selection signal which is applied to selector 16, particularly to switch 10.

Figure 5:
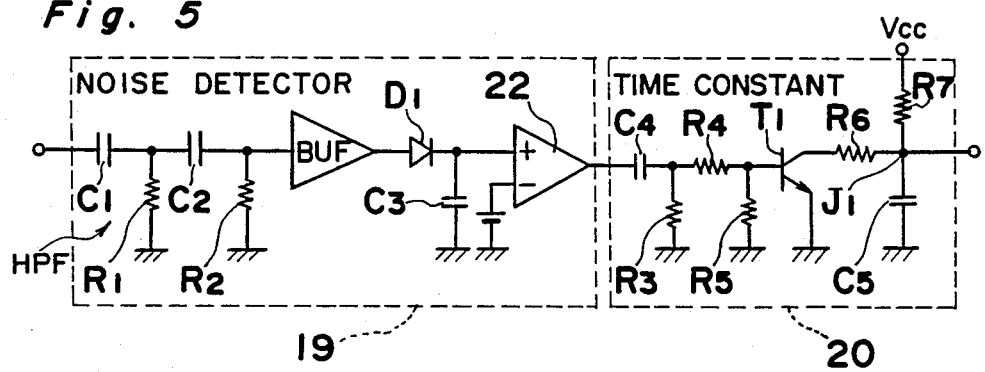
FIG. 5 is circuit diagram showing a detail of a noise detector circuit and a time constant circuit employed in the circuit of FIG. 4.

Referring to FIG. 5, a detailed circuit diagram of noise detector 19 and time constant circuit 20 are shown. Noise detector 19 includes a high pass filter HPF defined by capacitors C1 and C2 and resistors R1 and R2 so as to permit signals having a frequency higher than the IF band, such as above 100 kHz, to pass therethrough, and are applied to a buffer BUF. Then, the filtered signal is further applied to a detector defined by a diode D1 and capacitor C3 to detect the noise signal. The detected noise signal is applied to a comparator 22 which produces a HIGH or LOW level signal when the detected noise signal is above or below a predetermined threshold level, respectively.

Time constant circuit 20 includes a filter defined by a capacitor C4 and a resistor R3, resistors R4 and R5 for improving the sensitivity, and an emitter grounded transistor T1. The collector of transistor T1 is connected through a resistor R6 to a junction J1 between resistor R7 and capacitor C5. By a constant voltage Vcc applied to resistor R7, capacitor C5 is normally charged so as to produce a HIGH level signal from junction J1.

When comparator 22 of noise detector 19 produces a HIGH level signal, indicating that the noise signal is detected, transistor T1 turns on to discharge capacitor C5. Thus, the voltage at junction J1 is gradually reduced by the time constant determined by capacitor C5 and resistor R6.

Thereafter, when comparator 22 of noise detector 19 produces a LOW level signal, indicating that the noise signal has disappeared, transistor T1 turns off to permit charging of capacitor C5 by a current from resistor R7. Thus, the voltage at junction J1 gradually increases by the time constant determined by capacitor C5 and resistor R7.

Figure 6:
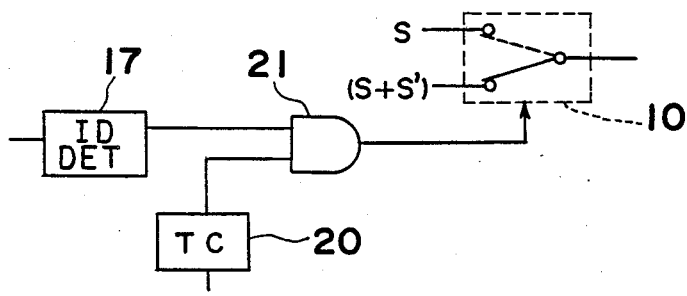
FIG. 6 is a circuit diagram showing a detail of a selection signal generator employed in the circuit of FIG. 4.

Referring to FIG. 6, a detailed circuit diagram of selection signal producer 21 is shown which includes an AND gate having one input connected to ID detector 17 and other input connected to time constant circuit 20. The output of AND gate 21 is connected to switch 10 provided in selector 16. Switch 10 is so arranged that, when a HIGH level signal is applied thereto from AND gate 21, it is turned to a position shown by a solid line, and when a LOW level signal is applied thereto, it is turned to a position shown by a dotted line (FIG. 6).

The operation of the FM/FMX stereophonic receiver according to a first embodiment of the present invention (FIG. 4) is as follows. In a case where an FM stereophonic broadcast containing no 10-Hz ID signal is received, ID detector 17 produces a LOW level signal indicating that the ID signal is not present. Thus, AND gate 21 produces a LOW level signal regardless of whatever signal produced from time constant circuit 20. Thus, switch 10 is turned to a condition shown by a dotted line in FIG. 6 so that selector 16 selects uncompressed stereophonic difference signal S. As a result, stereophonic sum signal M and uncompressed stereophonic difference signal S are matrixed by matrix circuit 9, and left and right stereophonic signals L and R are applied to left and right output terminals 11 and 12, respectively.

Next, in a case where an FMX stereophonic signal is received, ID detector 17 produces a HIGH level output signal upon detection of the ID signal. Thus, AND gate is enabled to permit the signal from time constant circuit 20 to pass therethrough.

In this case, if no multipath interference is occurring, no multipath noise signal will be detected by noise detector 19. Thus, comparator 22 will produce a LOW level signal to maintain transistor T1 in off condition. Thus, a HIGH level signal will be produced from junction J1, which is transmitted through AND gate 21 to switch 10. Thus, switch 10 is turned to a position indicated by a solid line in FIG. 6 so that matrix 9 utilizes the sum (S+S') of the stereo difference signal S and the compressed stereo difference signal S'. As a result, stereophonic sum signal M from FM detector 13c and signal (S+S') from selector 16 are matrixed by matrix circuit 9, and left and right stereophonic signals L and R are applied to left and right output terminals 11 and 12, respectively. In other words, the FM/FMX stereophonic receiver according to a first embodiment of the present invention (FIG. 4) is automatically set to an FMX receiving mode when the ID signal is present and, at the same time, no multipath signal is detected.

On the contrary, if the multipath interference is occurring, multipath noise signal will be detected by noise detector 19. Thus, comparator 22 will produce a HIGH level signal to turn transistor T1 on. Thus, capacitor C5 starts to discharge at a rate determined by the time constant of capacitor C5 and resistor R6. When capacitor C5 is discharged, AND gate 21 produces a LOW level signal which is applied to switch 10 which is turned to the position shown by the dotted line (FIG. 6). Thus, selector 16 selects uncompressed stereophonic difference signal S which is matrixed with stereophonic sum signal M by matrix circuit 9, resulting in the same receiving condition as the condition for receiving the FM stereophonic broadcast signal. In other words, the receiving mode is automatically changed from FMX receiving mode to FM receiving mode, in response to the detection of the multipath noise signal.

VCA 4 contained in selector 16 will be controlled by the signal relative to the stereophonic difference signal S. Since multipath noise signal adversely affects on stereo difference signal S, the output signal (S+S') from VCA will also be greatly influenced by the multipath noise signal. Furthermore, since rectifier 8 supplies control signal to VCA 4, the affect of the multipath noise signal will be prolonged relative to the time constant of the rectifier 8. Thus, even after noise detector 19 detects no further multipath noise signal, time constant circuit 20 is provided to prolong the production of the LOW level signal indicating that the multipath noise signal is receiving.

Thereafter, when the multipath noise signal disappears, time constant circuit 20 produces a HIGH level signal after a short period of time from a moment when noise detector 19 produces a LOW level signal indicating the disappearance of the multipath noise signal. Thus, the receiver again returns back to the FMX receiving mode.

According to the first embodiment as described above, since the receiver is automatically changed from the FMX receiving mode to FM receiving mode upon detection of the multipath noise signal, it is possible to reduce the influence of the multipath noise signal very small. Also, by the employment of time constant circuit 20, the undesirable affect caused by the multipath interference can be further avoided.

Figure 7:
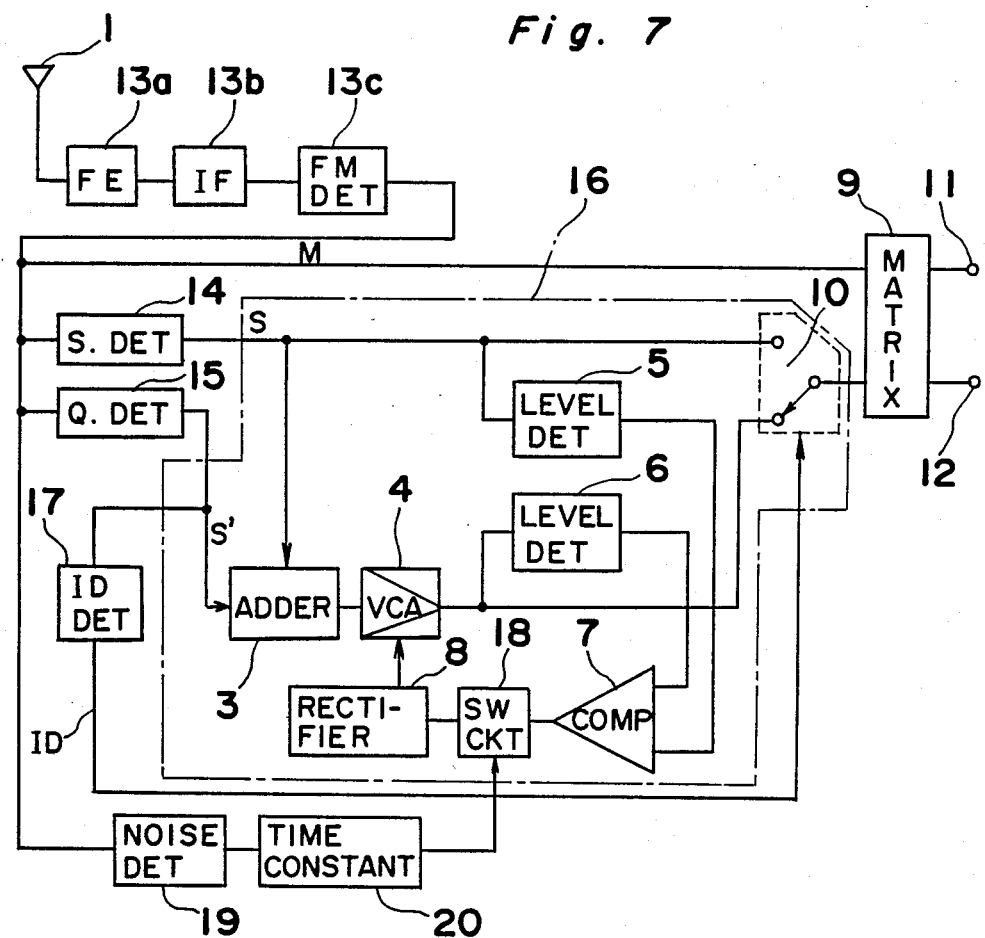
FIG. 7 is a circuit diagram of an FM/FMX stereophonic receiver according to a second embodiment of the present invention.

Referring to FIG. 7, an FM/FMX stereophonic receiver according to a second embodiment of the present invention is shown. According to the first embodiment, the output signal from time constant circuit 20 is applied through AND gate 21 to switch 10. However, in the second embodiment, the output signal from time constant circuit 20 is applied to a switching circuit 18 which is inserted between comparator 7 and rectifier 8. The detail of the switching circuit 18 is shown in FIG. 8.

Figure 8:
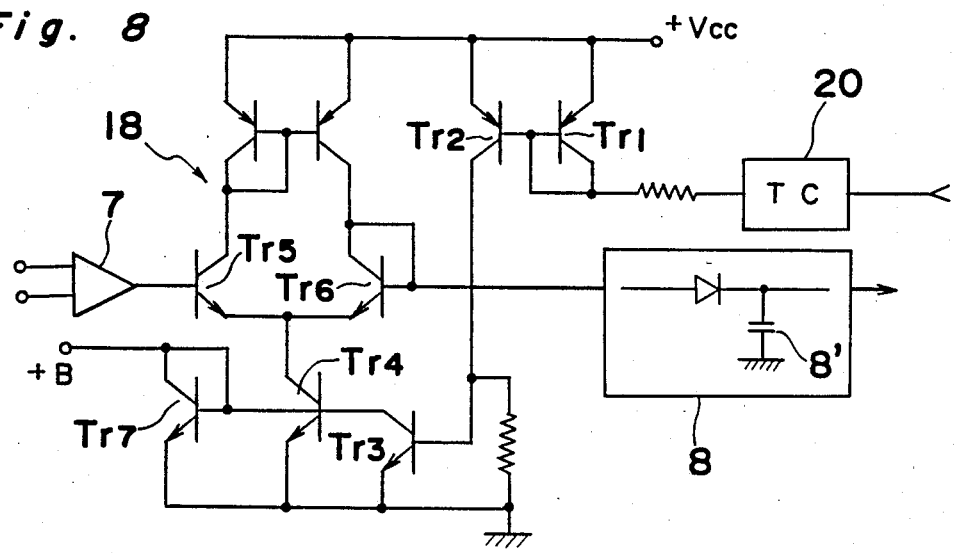
FIG. 8 is a circuit diagram showing a detail of a switching circuit employed in the circuit of FIG. 7.

Referring to FIG. 8, the switching circuit 18 comprises transistor Tr1 having its collector connected to timing constant circuit 20 and transistor Tr2 coupled to transistor Tr1. Transistor Tr2 is further coupled to transistor Tr3 which is coupled to transistors Tr4 and Tr7. Transistor Tr4 is coupled to transistors Tr5 and Tr6 which are inserted in a line from comparator 7 to rectifier 8.

During the receiving of FMX stereophonic signal and when noise detector 19 detects no multipath noise signal, time constant circuit 20 produces a HIGH level signal which is applied to the bases of transistors Tr1 and Tr2. Thus, transistor Tr2 turns off, and transistor Tr3 also turns off and, in turn, transistor Tr4 turns on. Thus, transistors Tr5 and Tr6 turn on to permit transmission of signal from comparator 7 to rectifier 8. In other words, switching circuit 18 is turned on. Thus, VCA 4 is controlled by a signal which is in relation to the level of the stereo difference signal S. The output signal (S+S') from VCA 4 is applied through switch 10 to matrix circuit 9 at which signal (S+S') is matrixed with stereophonic sum signal M. Thus, left and right stereophonic signals L and R are applied to left and right output terminals 11 and 12, respectively.

Next, during the receiving of FMX stereophonic signal and when noise detector 19 detects the multipath noise signal, time constant circuit 20 produces a LOW level signal which is applied to the bases of transistors Tr1 and Tr2. Thus, transistor Tr2 turns on, and transistor Tr3 also turns on and, in turn, transistor Tr4 turns off. Thus, transistors Tr5 and Tr6 turn off to prevent any transmission of data from comparator 7 to rectifier 8. In other words, switching circuit 18 is turned off. Accordingly, VCA 4 has a rate of gain which is determined by the voltage remaining in rectifier 8, such as a voltage produced across a capacitor 8' (FIG. 8) provided in rectifier 8. Thus, the control will no longer be carried out by the output signal from comparator 7. Since such a voltage produced from rectifier 8 is very close to the voltage that has been produced from rectifier 8 before the switching circuit 18 is turned off, VCA 4 will operate without any abrupt change even after the turn off of switching circuit 18 by preferably setting the pulse width of the signal produced from time constant circuit 20.

According to the second embodiment, when the multipath noise signal is detected, the data transmission from comparator 7 to rectifier 8 is cut off, and at the same time, rectifier 8 continues to produce a voltage which is approximately the same as that produced before the transmission cut off. Thus, VCA 4 will not be controlled in disorder.

Although the present invention has been fully described with reference to preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. An FM/FMX stereophonic receiver for receiving an FMX stereophonic broadcast signal or FM stereophonic broadcast signal, said FM/FMX stereophonic receiver comprising:
   means for detecting multipath noise signal contained in said FMX stereophonic broadcast signal and for producing a detection signal when said multipath noise signal is detected; and
   means for selecting either one of FM receiving mode or FMX receiving mode, said selecting means automatically selecting said FM receiving mode when said multipath noise signal detecting means produces said detection signal.

2. An FM/FMX stereophonic receiver for receiving an FMX stereophonic broadcast signal which includes a stereo sum signal, a stereo difference signal, a compressed stereo difference signal and an FMX ID signal indicating the FMX stereophonic broadcast signal, said FM/FMX stereophonic receiver comprising:
   first detecting means for detecting and producing said stereo difference signal;
   second detector means for detecting and producing said compressed stereo difference signal;
   decoder means for detecting and producing a sum of said stereo difference signal and said compressed stereo difference signal;
   third detecting means for detecting and producing said ID signal;
   fourth detecting means for detecting multipath noise signal contained in said FMX stereophonic broadcast signal and for producing a detection signal when said multipath noise signal is detected; and
   means, responsive to the detection of said ID signal by said third detecting means, for selecting said signal from said first detecting means when said fourth detecting means produces said detection signal, and for selecting said signal from said second detecting means when said fourth detecting means produces no detection signal.

3. An FMX stereophonic receiver for receiving an FMX stereophonic broadcast signal which includes a stereo sum signal, a stereo difference signal and a compressed stereo difference signal, said FMX stereophonic receiver comprising:
   an expanding means for generating a sum S+S' utilizing a detected stereo difference signal and compressed difference signal, and also for controlling the level of said S+S' in accordance with said stereo difference signal;
   FM detection means for FM detecting said FMX stereophonic broadcast signal;

means for detecting multipath noise signal contained in said FMX stereophonic broadcast signal and for producing a detection signal when said multipath noise signal is detected, said multipath noise signal detecting means comprising a high pass filter for detecting a high frequency noise contained in an output signal of said FM detection means, and a comparator for comparing an output signal of said high pass filter with a predetermined reference voltage and for producing a noise detection pulse when said output signal of said high pass filter exceeds said predetermined reference voltage; and means for stopping the control of the level of said sum S+S', in accordance with an output signal from said detecting means.

4. An FMX stereophonic receiver as claimed in claim 3, further comprising a control signal generating means provided between said multipath noise detecting means and said stopping means for generating a control signal having a pulse width different from that of said noise detection pulse.

5. An FMX stereophonic receiver as claimed in claim 4, wherein said control signal generating means comprises a transistor which turns on in response to said noise detection pulse, and a capacitor for being charged and discharged at a predetermined time constant in response to off and on operation, respectively, of said transistor, said capacitor producing a voltage which is being applied to said stopping means, said capacitor being connected in parallel to said transistor between an emitter and a collector of said transistor.

* * * * *